United States Patent [19]

Walter et al.

[11] 4,156,883

[45] May 29, 1979

[54] LIGHT BARRIER ARRANGEMENT

[75] Inventors: Arthur Walter, Waldkirch; Günter Fetzer, Gundelfingen, both of Fed. Rep. of Germany

[73] Assignee: Erwin Sick Gesellschaft mit beschrankter Haftung Optik-Elektronik, Fed. Rep. of Germany

[21] Appl. No.: 794,427

[22] Filed: May 6, 1977

[30] Foreign Application Priority Data

Jun. 30, 1976 [DE] Fed. Rep. of Germany ....... 2629476

[51] Int. Cl.² ............................................ H01H 47/24
[52] U.S. Cl. .................................... 361/177; 361/191; 340/556; 250/222 R
[58] Field of Search ........ 361/176, 177, 191, 173–175; 340/228 S, 258 B; 250/221, 222

[56] References Cited

U.S. PATENT DOCUMENTS

| | | | |
|---|---|---|---|
| 3,211,961 | 10/1965 | Bayly et al. ........................ | 361/177 |
| 3,360,654 | 12/1967 | Muller .................................. | 250/221 |
| 3,536,923 | 10/1970 | Tellerman ........................ | 250/221 X |
| 3,743,290 | 7/1973 | Crimmins et al. ................ | 250/221 X |
| 4,012,635 | 3/1977 | Walter et al. ....................... | 250/221 |

Primary Examiner—William M. Shoop
Attorney, Agent, or Firm—Townsend and Townsend

[57] ABSTRACT

A light barrier system for monitoring the presence or absence of an obstacle in the monitored area and for simultaneously monitoring itself to detect contamination of the system. A photo-converter emits signals indicative of the light intensity of a light barrier beam and the signal is applied to a first, obstacle switch which is normally open but which closes at a relatively high level of darkness, i.e. when an obstacle is present. A converter signal is also applied to a second, contamination switch which is normally open but which closes at a lesser degree of darkness than the first switch so that both switches can be simultaneously closed. The outputs of the switches when closed are applied to relays to switch the relays between alternative position to indicate (a) the presence of an obstacle in the light curtain area and (b) the contamination of the light curtain system irrespective of whether or not an obstacle is present.

18 Claims, 8 Drawing Figures

LIGHT BARRIER ARRANGEMENT

BACKGROUND OF THE INVENTION

The invention relates to a light barrier arrangement which is able to monitor its own contamination.

When light barriers are used in situations where they are exposed to a considerable risk of contamination, it is often advantageous to provide an arrangement by which they are able to monitor their own contamination. This means that on exceeding a particular contamination level, which is preferably adjustable, a warning signal is emitted whilst the light barrier is still functioning perfectly. On the basis of this warning signal, the light barrier can be cleaned before it finally fails.

BRIEF SUMMARY OF THE INVENTION

The problem of the invention is therefore to provide a light barrier arrangement which monitors its own contamination, which can be realised with the most simple switching means and without great expenditure, whilst at the same time ensuring the necessary high operational reliability.

According to the invention, this problem is solved in that on the reception side a dark switching signal formed below a first given darkness level of the monitoring zone is applied directly to an obstacle indicating relay and via a first rectifier poled in the passage direction to a contamination indicating relay and a bright switching signal formed above a second given lower darkness level is applied via a second rectifier poled in the forward direction to the contamination indicating relay. "Below a first given darkness level" means in this context "in the direction of greater darkness," whereas "above a given darkness level" means "in the direction of greater brightness." The distance between the two switching thresholds of the dark switching signal and the bright switching signal is such that on indicating contamination, the light barrier arrangement can perfectly indicate the presence or absence of an obstacle by means of the dark switching signal.

Preferably, each relay has a make contact and a break contact. The contacts of the obstacle indicating relay indicate whether there is an obstacle in the monitoring zone. The two contacts of the contamination indicating relay indicate whether the light barrier arrangement is clean or dirty.

According to further advantageous embodiments, the make contact of the contamination indicating relay connected via the second rectifier to the bright light beam switch is connected between the first rectifier and the contamination indicating relay, whereby the latter drops out with a time lag which is greater than the switching time of the light beam switch. This arrangement has the advantage that when the light barrier arrangement is clean, the contamination indicating relay is always picked up and only drops out if it is dirty, thus emitting a constant warning signal.

A further embodiment is characterised by the provision of two light barriers whose monitoring beams at least partly overlap and which are exposed substantially to the same ambient conditions and whereof one is dark-switching and more sensitive and the other bright-switching and less sensitive.

An embodiment which is simpler with respect to the optical elements is constructed in such a way that only a single light barrier is provided parallel to two threshold switches, whereof one has a lower threshold and a negator and the other a higher threshold. Thus, in this embodiment, the two thresholds required for forming the contamination signal are formed electronically.

Finally, the invention also relates to a light barrier arrangement which monitors its own contamination in which one light barrier is connected to a variable gain amplifier, whose output quantity is derived from a comparator via a store. In the case of an uninterrupted light barrier, the comparator compares the output voltage of the variable gain amplifier with a constant reference level, whereby the output of the variable gain amplifier is connected to the obstacle indicating relay by a first threshold switch and the control voltage is connected via a second threshold switch to the contamination indicating relay. This embodiment has the advantage that the first threshold switch is subject to the action of a constant switching voltage, whereby the control voltage can be simultaneously used for controlling the contamination indicating relay. The store applied to the comparator is constructed in such a way that it stores the control value obtained in the case of an uninterrupted light barrier and still supplies the variable gain amplifier during the period when an obstacle briefly enters the light barrier. It is therefore very important that the automatic control system does not respond during the time when an obstacle is located in the light barrier. Therefore, the store must have corresponding time lag elements.

BRIEF DESCRIPTION OF THE DRAWINGS

Other and further objects of the present invention will be apparent from the following description and claims and are illustrated in the accompanying drawings, wherein show:

DETAILED DESCRIPTION OF THE PREFERRED EMBODIMENTS

Figure 1:
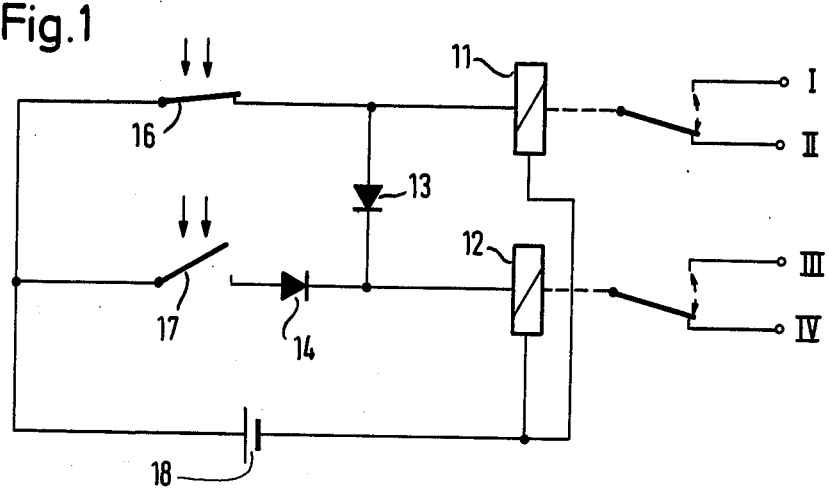
FIG. 1 a first advantageous embodiment of a self monitoring light barrier arrangement.

FIG. 1 generally illustrates the switching arrangement of the present invention which cooperates with suitable optics more fully described below. Photoelectric detector means in the form of switches 16, 17 are associated with the optics to generate switching signals in response to the level of light flux received. When a light beam is interrupted by an obstacle, it is alternated and thus the light incident on the photoelectric detector, illustrated schematically by arrow in FIG. 1, is reduced and corresponds to relative darkness. The first, obstacle, light switch 16 is normally open, i.e. it is open when there is no obstacle in the sensed light beam and the beam is relatively bright. However, when an obstacle is sensed and the light beam becomes relatively dim, a corresponding signal is applied to the obstacle switch 16 which results in the switch closing.

A second, contamination switch 17 is provided and it is also operated by a signal that is responsive to the sensed intensity of the light beam. The contamination switch 17 is normally closed, that is it is closed when the light beam arrangement is not contaminated and the beam is relatively bright. If contamination of the system occurs, however, the level of light intensity is lowered, typically by much less than when an obstacle is present in the light beam. The contamination switch 17 opens when the light intensity of the beam is reduced to a beam intensity or brightness which is greater than the light intensity at which the obstacle switch 16 closes. In other words, the normally open obstacle switch 16 closes when a relatively pronounced level of darkness is reached while the normally closed contamination switch 17 opens when a substantially less prounounced level of darkness is reached as compared to the darkness level at which the obstacle switch closes.

Thus, there is an intermediate interval defined between the thresholds of the two switches, i.e. an interval corresponding to contamination of the system which results in a modest reduction in the intensity of the light beam but which is nevertheless brighter than the level of darkness prevailing when an obstacle is present. Both switches 16 and 17 are open in this interval.

In a simple practical embodiment the linking proceeds so that the closed light beam switch 16 connects a power source 18 to a first obstacle indicating relay 11, whilst the closing of bright light beam switch 17 connects a contamination indicating relay 12 onto a voltage source 18 via a diode 14 poled in the forward direction. Light beam switch 16 is also connected via a further diode 13 with relay 12.

Each relay 11, 12 has a make contact I, III and a break contact II, IV, so that depending on the contamination level of the light barrier arrangement and the presence or absence of an obstacle a total of four switching positions are possible:

Contact at I: No obstacle (dark light beam switch 16 open)

Contact at II: Obstacle in beam (dark light beam switch 16 closed bright light beam switch 17 open)

Contact at III: Contamination of light barrier: Dark light beam switch 16 open, bright light beam switch 17 open)

Contact at IV: No contamination (light beam switch 16 or 17 closed).

Figure 2:
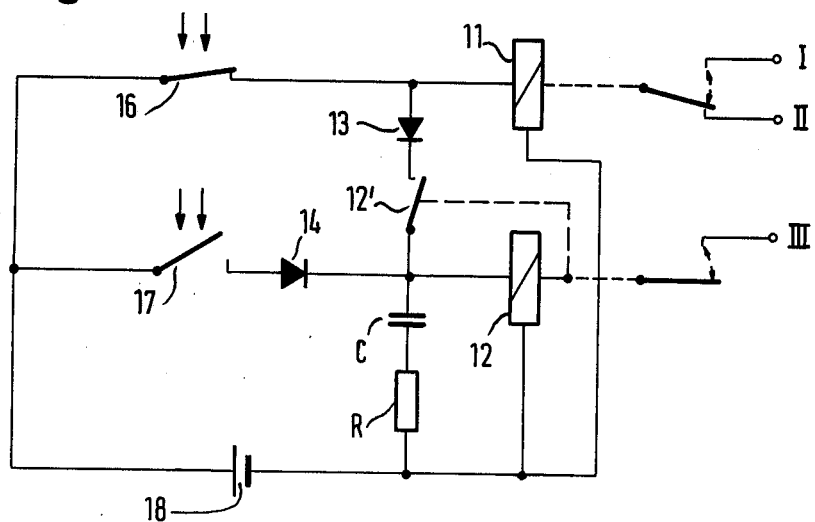
FIG. 2 a further preferred embodiment.

A modified embodiment is shown in FIG. 2, which differs from the circuit of FIG. 1 in that between diode 13 and the second relay 12 is connected a make contact of said relay 12. In addition, an RC network is connected parallel to relay 12 in order to ensure a delayed dropout of relay 12 in the case when both light beam switches 16, 17 are both opened briefly. Contamination indication is now supplied solely by a break contact III.

When the light barrier is clean, relay 12 is constantly picked up, because it is applied to voltage source 18, either via light beam switch 16 and diode 13 or light beam switch 17 and diode 14. The RC network maintains relay 12 picked up during the short switching time of switches 16, 17.

In the case of a contamination of the light barrier without an obstacle both light beam switches 16, 17 are open, so that at the end of the short time lag of the RC network, relay 12 drops out and break contact III is applied to a voltage. Since, due to the sensitivity selection light beam switch 17 can no longer close, the warning signal is maintained until the light barrier is clean again.

Figure 3:
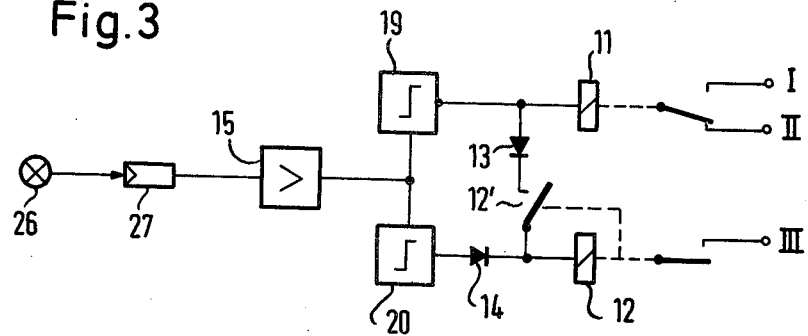
FIG. 3 an embodiment of the light barrier arrangement working with electronic threshold switches.

FIG. 3 shows an arrangement operating with a light barrier comprising only one light source 26 and a photo-receiver 27, whereby, via an amplifier 15, the photo-receiver 27 is connected in parallel to threshold switches 19, 20. The threshold of threshold switch 19 is set for lower brightness. The threshold switch 19 comprises a switch element provided with a negator, so that signal 0 appears at its output on illumination of photo-receiver 27. The other threshold switch 20 has a threshold set for greater brightness and comprises of simply a switch element and no negator. Both switch elements thus switch in the same direction.

The circuit connected to the two threshold switches 19, 20 corresponds to the circuit of FIG. 2 as connected to light beam switches 16, 17. The function is also the same. The RC network is not shown because in certain circumstances the mechanical inertia of the relay is sufficient to obtain the necessary time lag.

Figure 4:
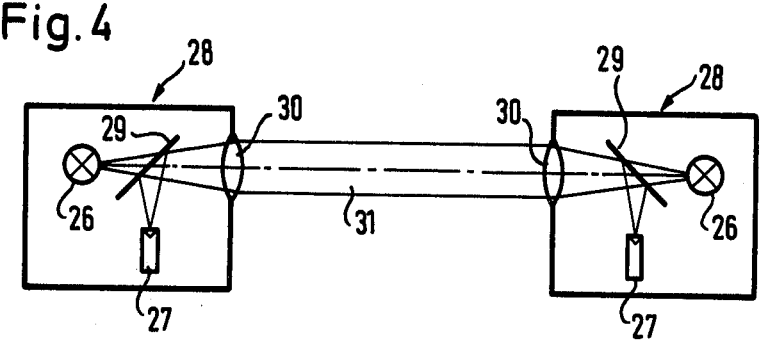
FIGS. 4 to 7 further advantageous embodiments of self interacting light barriers for use with the described light barrier arrangements.

For the realisation of the light barrier arrangements according to FIGS. 1 and 2, at least partly interacting light barriers are required, advantageous embodiments of which are shown in FIGS. 4 to 7. FIG. 4 shows two transmitter-receiver units 28, having in each case a lamp 26, a photo-converter 27, a beam splitting mirror 29 and an optical system 30. By making the two transmitter-receiver units precisely face one another, two interacting light beams 31 are produced. The converters 27 supply light beam switches 16, 17 respectively.

Figure 5:
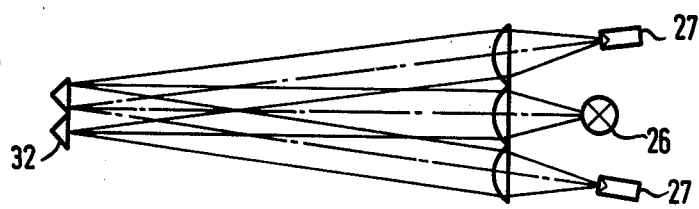

FIG. 5 shows an arrangement with only one lamp 26 and two photo-electric converters 27, subject to the action of a somewhat diffuse-reflecting reflector 32. In the embodiment of FIG. 5 all the electrical components are all arranged on one side of the monitoring zone.

Figure 7:
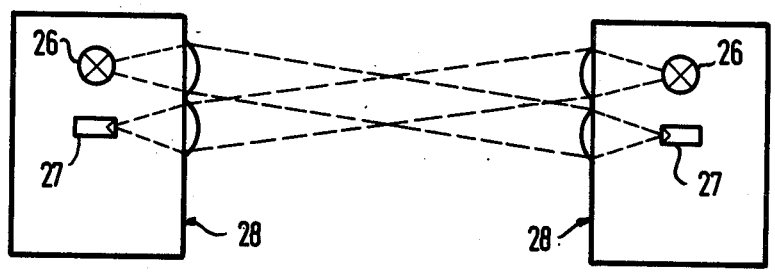

FIG. 7 shows another light barrier arrangement which can be used in connection with the embodiments of FIGS. 1 and 2. The light beams emanating from the transmitter-receiver units 28 cross one another so that as in the embodiment of FIG. 4 both transmitter-receiver units can be identically constructed.

Figure 6:
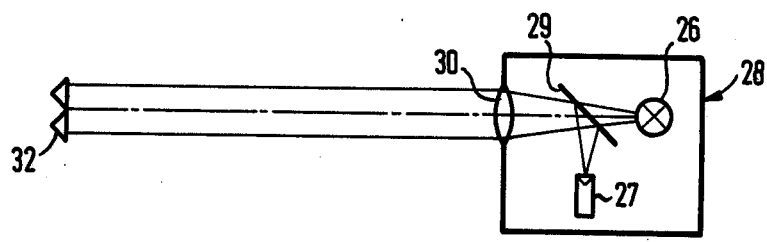

In the embodiment according to FIG. 6, only one transmitter-receiver unit 28 is provided from which a light beam is reflected back on a reflector 32 and via a beam splitting mirror 29 is directed onto a single photo-receiver 27, which is connected to amplifier 15 according to FIG. 3.

Figure 8:
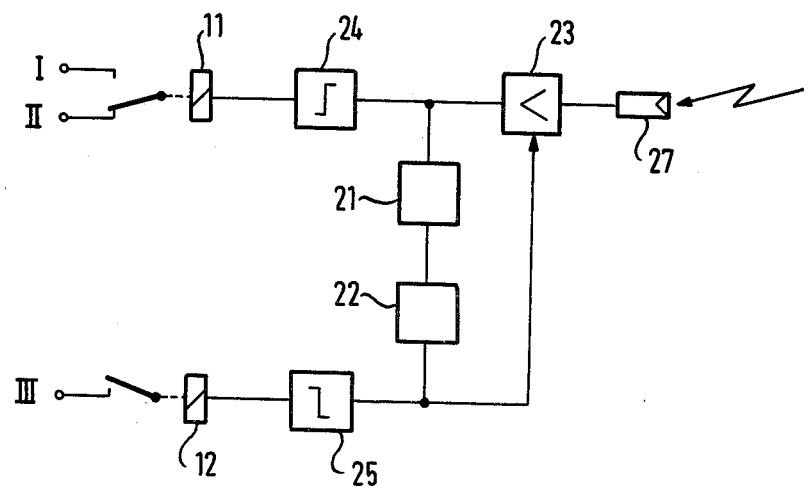
FIG. 8 a further embodiment of a light barrier arrangement.

FIG. 8 shows a further light barrier arrangement, which can for example operate with a light barrier according to FIG. 6.

In this case, photo-receiver 27 is connected to a variable gain amplifier 23, whose output is supplied to the control input via a comparator 21 and a store 22. In addition, the output of variable gain amplifier 23 is connected to a threshold switch 24 to which is applied the obstacle indicating relay 11. By means of a further threshold switch 25 the control voltage is also applied to the contamination indicating relay 12.

If the light barrier is not interrupted, the output of variable gain amplifier 23 is regulated to a predetermined level. The control value is stored in store 22, so that it remains available for the variable gain amplifier 23 during the short period when an obstacle is indicated in the light barrier. Thus, store 22 contains a timing element eliminating an automatic regulation when an obstacle is in the light barrier.

Threshold value switch 24 therefore always receives a constant basic signal, which is only interrupted if an obstacle penetrates into the light barrier beam, whereupon obstacle indicating relay 11 responds and switching from II to I takes place.

As the control voltage increases with increasing contamination of the light barrier, it will finally reach a value which is sufficient for the switching through of the further threshold switch 25. Contamination indicating relay 12 now picks up and a permanent warning signal is emitted at III.

The invention is not limited to the embodiments described and represented hereinbefore and various modifications can be made thereto without passing beyond the scope of the invention.

What is claimed is:

1. A light barrier arrangement capable of monitoring itself for the presence of contamination the light barrier arrangement comprising means for monitoring a beam of light including first and second threshold switches, each threshold switch being adapted to switch from a first state to a second state as the light intensity received by the switch passes through the respective threshold for the switch, the thresholds of the switches being set at respective different levels corresponding to different levels of light flux, and circuit means for detecting when both the switches are in states corresponding to a level of light flux received lying intermediate the levels corresponding to the two thresholds for producing a contamination indication signal.

2. A light barrier arrangement according to claim 1 wherein the first and second switches are adapted to be in the same state on receipt of a level of light intensity intermediate the levels corresponding to their two respective thresholds.

3. A light barrier arrangement according to claim 2 and in which said same state is a non-conducting state.

4. Light barrier arrangement according to claim 1 wherein the circuit means includes light receiving means for monitoring the beam of light, and wherein the first and second threshold switches are connected in parallel with the light receiving means.

5. Light barrier arrangement according to claim 1 wherein the means for monitoring the light beam further comprises a photoelectric converter connected to pass to the threshold switches a signal responsive to the light intensity received.

6. A light barrier arrangement according to claim 3 wherein said circuit means comprises a voltage source, an obstacle indicating relay, a contamination relay, means for connecting said voltage source to the obstacle relay via the first said threshold switch and via a forwardly poled first diode to the contamination indicating relay, means connecting the contamination relay to the voltage source via the second threshold switch and a forwardly poled second diode, the relays each having a pair of associated contacts and means for moving said contacts from a first position to a second position on energization of each respective relay, and means for detecting the positions of the contacts of said contamination indicating relay to produce the contamination indicating signal.

7. Light barrier arrangement in accordance with claim 6 wherein one of the contacts of the contamination relay is disposed as a switch between the first diode and the contamination relay, and including means for insuring that the contamination relay takes longer to disengage than the switching time of the threshold switches.

8. Light barrier arrangement in accordance with claim 7 and in which the last mentioned means comprises means providing the contamination relay with a longer drop out time.

9. Light barrier arrangement in accordance with claim 7 and in which the last mentioned means comprises an RC network connected to the contamination relay, the time constant of said RC network being greater than that of the switching time of said switches.

10. Light barrier arrangement according to claim 11 wherein the switches comprise switch elements switching in the same direction and one of said switch elements is provided with a negator, whereby the switch element provided with the negator switches in the other direction to the other switch comprising the other switch element and no negator.

11. Light barrier arrangement capable of monitoring itself for detecting the presence of contamination, the light barrier arrangement comprising a photoelectric converter for receiving the light intensity prevailing in the light barrier, first and second threshold switches, a variable gain amplifier connected to the photoelectric converter, means for forming a control value for the variable gain amplifier to hold the output potential thereof substantially constant when the light barrier is unobstructed at a level corresponding to an uncontaminated beam, and means for passing the output of the variable gain amplifier to an obstacle indicating device via the first threshold switch, and means for passing the control value to a second contamination indicating device via the second threshold switch.

12. Light barrier arrangement according to claim 11 and in which the means for forming the control value comprises a comparator having a first input connected to sense a value corresponding to the value of the output potential of the variable gain amplifier and a second input connected to a constant reference level.

13. Light barrier arrangement according to claim 12 and further comprising a store including a timing delay element connected to said comparator to receive and store the control value for a time determined by the timing delay element.

14. A light barrier arrangement capable of monitoring itself for the presence of contamination, the light barrier arrangement comprising means for monitoring a beam of light including first and second threshold switches, the threshold switches having different respective thresholds and being adapted to switch in different directions to opposite states when the intensity of light monitored has changed from a value above to a value below their respective thresholds, and from a value below to a value above their respective thresholds, and means for detecting when both the switches are in the same state to produce a contamination indication signal.

15. Light barrier arrangement according to claim 14 wherein the threshold switches are connected in parallel to said means for monitoring the beam of light.

16. A light barrier arrangement according to claim 14 and further comprising a voltage source, means for connecting said voltage source to an obstacle indicating relay via the first threshold switch and via a forwardly poled diode to a second relay, the relays each having a pair of associated contacts, means for moving said contacts from a first position to a second position on energization of each respective relay, and means for detecting the positions of both sets of contacts to produce said contamination indication signal.

17. Light barrier arrangement according to claim 15 and further comprising a variable gain amplifier connected to said photo-electric converter, means for forming the control value for said variable gain amplifier from the output of a comparator, means for supplying to said comparator as input, a value corresponding to the value of the output potential of said variable gain amplifier prevailing during the presence of an uninterrupted light beam, and a constant reference level and means for passing the output of the control amplifier to an obstacle indicating relay via the first threshold switch and to a second contamination indicating relay via said second threshold switch.

18. Light barrier arrangement according to claim 4 wherein the switches comprise switch elements switching in the same direction and one of said switch elements is provided with a negator, whereby the switch element provided with the negator switches in the other direction to the other switch comprising the other switch element and no negator.

* * * * *